(12) United States Patent
Sato et al.

(10) Patent No.: US 11,077,419 B2
(45) Date of Patent: Aug. 3, 2021

(54) ADSORBENT, VACUUM HEAT INSULATING MATERIAL HAVING THE SAME AND REFRIGERATOR

(71) Applicant: SAMSUNG ELECTRONICS CO., LTD., Suwon-si (KR)

(72) Inventors: Nagahisa Sato, Yokohama (JP); Ryo Iwamuro, Yokohama (JP); Tomokazu Fukuzaki, Yokohama (JP); Kenichi Nagayama, Yokohama (JP); Ryosuke Kamitani, Yokohama (JP); Kenji Takeuchi, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 5 days.

(21) Appl. No.: 15/539,848

(22) PCT Filed: Dec. 22, 2015

(86) PCT No.: PCT/KR2015/014085
§ 371 (c)(1),
(2) Date: Jun. 26, 2017

(87) PCT Pub. No.: WO2016/105077
PCT Pub. Date: Jun. 30, 2016

(65) Prior Publication Data
US 2017/0368530 A1    Dec. 28, 2017

(30) Foreign Application Priority Data

Dec. 26, 2014 (JP) .................................. 2014-266776
Dec. 26, 2014 (JP) .............................. JP2014-266777
(Continued)

(51) Int. Cl.
*B01J 20/04* (2006.01)
*F25D 23/06* (2006.01)
(Continued)

(52) U.S. Cl.
CPC .............. *B01J 20/04* (2013.01); *F25D 23/06* (2013.01); *B01J 20/06* (2013.01); *F25D 11/00* (2013.01); *F25D 2201/14* (2013.01)

(58) Field of Classification Search
CPC .................................. B01J 20/04; F25D 23/06
See application file for complete search history.

(56) References Cited

U.S. PATENT DOCUMENTS 6,200,494 B1 * 3/2001 Manini .................. H01J 7/183
                                                            252/181.7
2009/0126573 A1   5/2009 Kinoshita
(Continued)

FOREIGN PATENT DOCUMENTS

| CN | 85102708 | 9/1986 |
| CN | 1361709 | 7/2002 |

(Continued)

OTHER PUBLICATIONS

Written Opinion; Form PCT/ISA/237; dated Mar. 22, 2016 in corresponding PCT Application No. PCT/KR2015/014085 (8 pages).
(Continued)

*Primary Examiner* — Sheng H Davis
*Assistant Examiner* — Michael Forrest
(74) *Attorney, Agent, or Firm* — Staas & Halsey LLP

(57) ABSTRACT

Described is an adsorbent, a vacuum heat insulating material having the same and a refrigerator, which are capable of adsorbing a target material in a reduced pressure environment. A refrigerator includes an outer casing forming an exterior, an inner casing provided inside the outer casing and forming a storage chamber and a vacuum heat insulating material positioned between the outer casing and the inner casing, and including an adsorbent that adsorbs a heat transfer medium. The adsorbent includes a first adsorption component provided to adsorb oxygen, and including a
(Continued)

transition metal oxide having an oxygen deficiency structure, and a second adsorption component provided to adsorb moisture.

13 Claims, 6 Drawing Sheets

(30) Foreign Application Priority Data

May 22, 2015 (JP) .................................. 2015-104477
Nov. 27, 2015 (JP) .................................. 2015-231859
Dec. 11, 2015 (KR) ........................ 10-2015-0177155

(51) Int. Cl.
*B01J 20/06* (2006.01)
*F25D 11/00* (2006.01)

(56) References Cited

U.S. PATENT DOCUMENTS

| | | | |
|---|---|---|---|
| 2014/0178626 A1* | 6/2014 | Min | F16L 59/065 428/69 |
| 2014/0248452 A1 | 9/2014 | Luca et al. | |

FOREIGN PATENT DOCUMENTS

| | | | | |
|---|---|---|---|---|
| CN | 1674980 | | 9/2005 | |
| CN | 101330971 | | 12/2008 | |
| GB | 921273 | A * | 3/1963 | ............. H01J 19/28 |
| JP | 2006-75756 | | 3/2006 | |
| JP | 2007185653 | A * | 7/2007 | |
| JP | 2010-189245 | | 9/2010 | |
| KR | 10-2010-0026993 | | 3/2010 | |
| KR | 20100026993 | A * | 3/2010 | ............ F16L 59/065 |
| KR | 10-2014-0110144 | | 9/2014 | |
| KR | 10-2014-0141420 | | 12/2014 | |
| WO | WO 2014/178540 A1 | | 11/2014 | |
| WO | WO 2016/105077 A1 | | 6/2016 | |

OTHER PUBLICATIONS

International Search Report; Form PCT/ISA/210; dated Mar. 22, 2016 in corresponding PCT Application No. PCT/KR2015/014085 (3 pages) (2 pages English Translation).
Chinese Office Action dated May 8, 2019 in Chinese Patent Application No. 201580071075.1.
Chinese Office Action dated Mar. 23, 2020 in Chinese Patent Application No. 201580071075.1.
Chinese Office Action dated Dec. 14, 2020, in corresponding Chinese Patent Application No. 201580071075.1.
Chinese Office Action dated Mar. 26, 2021, in corresponding Chinese Patent Application No. 201580071075.1.

\* cited by examiner

FIG. 4

|  | MAIN TARGET MATERIAL | REPRESENTATIVE EXAMPLE |
|---|---|---|
| FIRST ADSORPTION COMPONENT | $O_2$ | $TiO_{2-x}, CeO_{2-x}$ |
| SECOND ADSORPTION COMPONENT | $H_2O$ | $CaO$ |
| THIRD ADSORPTION COMPONENT | $H_2$ | $PdO$ |

ADSORBENT, VACUUM HEAT INSULATING MATERIAL HAVING THE SAME AND REFRIGERATOR

This application is a U.S. national stage application under 35 USC 371 of PCT International Patent Application No. PCT/KR2015/014085, filed on Dec. 22, 2015, which claims the benefit of Japanese Patent Application No. 2014-266776, filed on Dec. 26, 2014, Japanese Patent Application No. 2014-266777, filed on Dec. 26, 2014, Japanese Patent Application No. 2015-104477, filed on May 22, 2015, Japanese Patent Application No. 2015-231859, filed Nov. 27, 2015, and Korean Patent Application No. 10-2015-0177155, filed on Dec. 11, 2015, the contents of which are incorporated herein by reference.

TECHNICAL FIELD

Embodiments of the disclosure relate to an adsorbent, a vacuum heat insulating material having the same and a refrigerator, and more particularly, to an adsorbent, a vacuum heat insulating material having the same and a refrigerator, which are capable of adsorbing a target material even in a reduced pressure environment.

BACKGROUND ART

Recently, a movement related to energy conservation has been actively promoted, so that a vacuum heat insulating material capable of exhibiting an excellent thermal insulation effect is required in household appliances or equipment.

For the vacuum heat insulating material, it is known that a core material having micropores such as glass wool or silica powder is covered with a gas barrier envelope and the inside of the envelope is sealed under reduced pressure. To maintain the excellent thermal insulation effect of the vacuum heat insulating material for a long time, an adsorbent for removing a heat transfer medium such as water vapor, oxygen, and nitrogen permeating the vacuum heat insulating material is sealed with the core material under reduced pressure.

For the adsorbent, a chemical type adsorbent which irreversibly and fixedly adsorbs moisture is known. An example is Calcium oxide (CaO). Meanwhile, a moisture adsorbent such as calcium oxide does not have an adsorptive ability against oxygen and nitrogen in the air that penetrate the envelope of the vacuum heat insulating material. Therefore, in order to maintain the reduced pressure state in a vacuum insulating environment, an adsorbent for these gases is required.

A metal adsorbent made of barium getters or ternary alloys of zirconium-vanadium-iron has been widely known to have an adsorptive ability against oxygen or nitrogen. Since the metal adsorbent needs to be activated at a high temperature of 400° C. or higher in the reduced pressure environment, most of the vacuum heat insulating material which sets up the reduced pressure environment with a multi-layered envelope of plastic film and metal foil cannot be fundamentally used for the metal adsorbent because the envelope melts and breaks.

Meanwhile, as a gas adsorbent that does not need to be activated in advance, there is, for example, a nitrogen/oxygen adsorbing Ba—Li alloy. Japanese Patent Application No. 1996-159377 discloses a vacuum heat insulating material using the Ba—Li alloy as a getter material of nitrogen and oxygen. In detail, by mixing the Ba—Li alloy and the moisture adsorbent the time for leaving the getter material as it is in the atmosphere can be increased.

DISCLOSURE

Technical Problem

When household appliances are crushed for disposal, the adsorbent is crushed along with the vacuum heat insulating material, so the Ba—Li alloy is exposed. If water is sprayed to suppress the generation of dust at the time of the crushing, a large amount of hydrogen gas is generated at one time because the Ba—Li alloy reacts well with water. Therefore, the Ba—Li alloy cannot be put to practical use in terms of safety.

Here, it is an object of the disclosure to provide an adsorbent, a vacuum heat insulating material having the same and a refrigerator, which are safe even without activation under high temperature and have excellent adsorption performance for a target material under a reduced pressure environment.

Technical Solution

As a result of study on the adsorbent capable of achieving the above object, the present inventors have found that when titanium oxide or cerium oxide, which is a transition metal oxide having an oxygen deficiency structure, is used together with an alkaline earth metal oxide (for example, calcium oxide), no activation treatment is required and an oxygen adsorption performance is excellent despite of being used in a vacuum state. Titanium oxide or cerium oxide, which has the oxygen deficiency structure, has been studied only for oxygen adsorption function under atmospheric pressure, but has not ever been considered as the vacuum heat insulating material. In fact, there has been no report on the effect of oxygen adsorption in the vacuum state.

In order to achieve the above object, an adsorbent of the disclosure is characterized by comprising a transition metal oxide such as titanium oxide or cerium oxide, which has an oxygen deficiency structure, and a second adsorption component for adsorbing moisture as an active component, and adsorbing a target material under a reduced pressure environment. Further, a vacuum heat insulating material of the disclosure is characterized by having an insulation effect by putting an internal environment in a reduced pressure state and putting itself in a heat conduction region, and having an envelope and an adsorbent contained in the envelope together with a core material, wherein the adsorbent comprises titanium oxide or cerium oxide, which has an oxygen deficiency structure, and a second adsorption component for adsorbing moisture as active components to adsorb the target material under the reduced pressure environment.

Advantageous Effects

According to the disclosure, it is possible to provide an adsorbent, a vacuum heat insulating material having the same and a refrigerator, which are safe even without activation under high temperature and have excellent adsorption performance for a target material even under a reduced pressure environment.

DESCRIPTION OF DRAWINGS

These and/or other aspects of the disclosure will become apparent and more readily appreciated from the following description of the embodiments, taken in conjunction with the accompanying drawings of which:

FIG. 4 is a table showing characteristics of a first adsorption component, a second adsorption component and a third adsorption component constituting an adsorbent of a vacuum heat insulating material in accordance with an embodiment of the disclosure;

MODE FOR INVENTION

Figure 1:
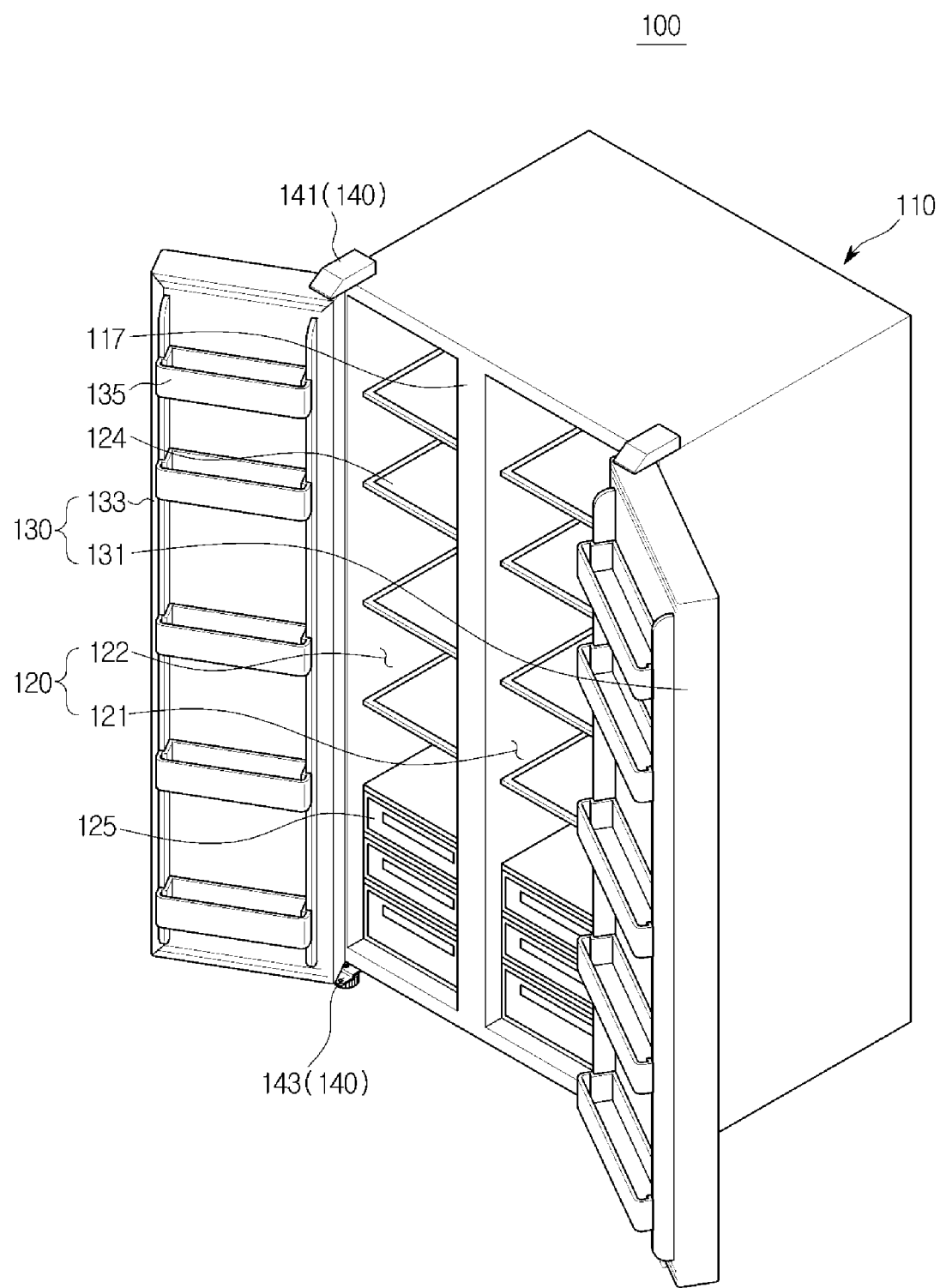
FIG. 1 is a perspective view illustrating an external appearance of a refrigerator in accordance with an embodiment of the disclosure.

Hereinafter, a highly preferred embodiment of the disclosure will be described in detail with reference to accompanying drawings. In the specification and drawings, elements having substantially the same function are denoted by the same reference numerals, and overlapping description will be omitted.

A vacuum heat insulating material to which an adsorbent of the disclosure is applied is known to have a core material having micropores such as glass wool or silica powder, which is covered with an envelope having a gas barrier property to seal the inside of the envelope under reduced pressure, and used in a refrigerator, a freezer, a hot water supply container, a vacuum heat insulating material for an automobile, a heat insulating material for construction, a vending machine, a cold storage box, a warmer, a refrigerator vehicle and so on.

Hereinafter, description will focus on a case where a vacuum heat insulating material, to which an adsorbent of the disclosure is applied, is used in a refrigerator.

Figure 2:
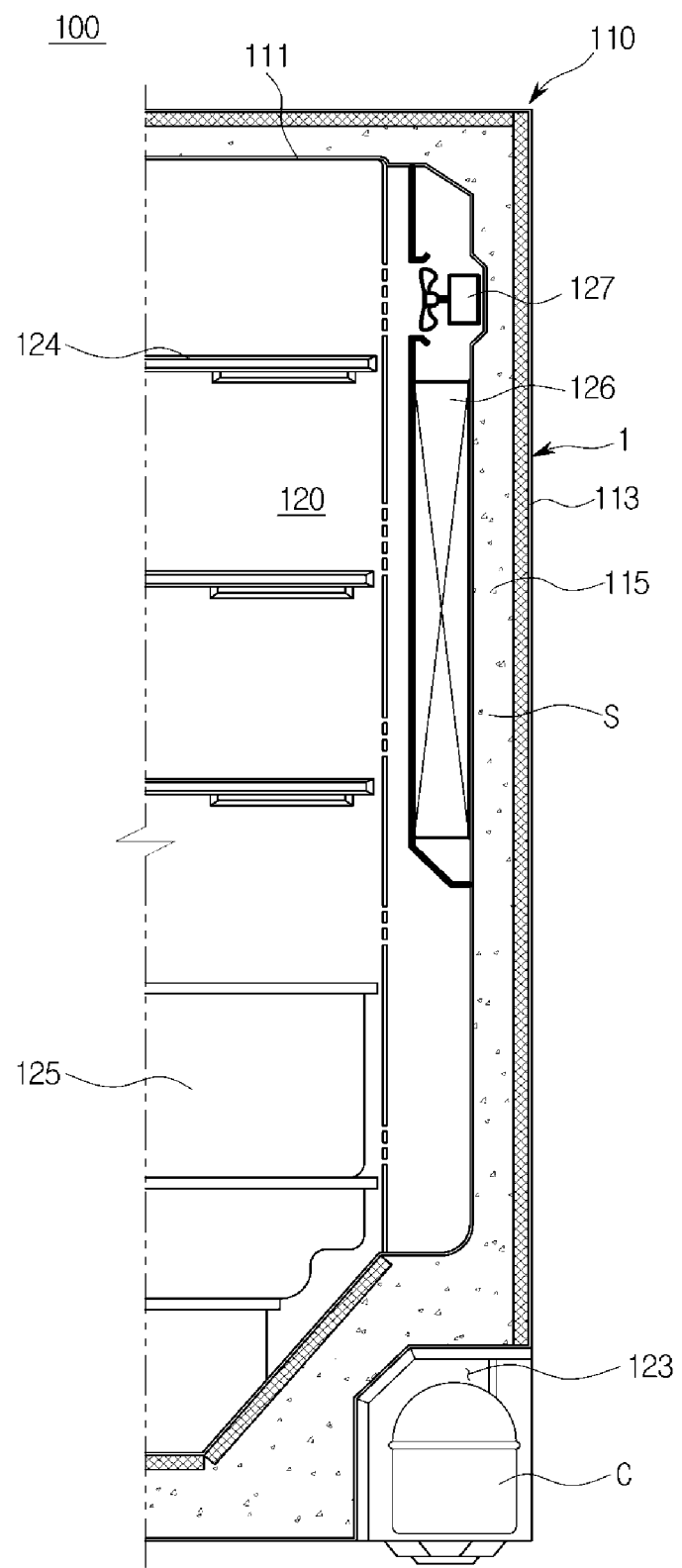
FIG. 2 is a cross-sectional view illustrating the refrigerator in accordance with an embodiment of the disclosure.

FIG. 1 is a perspective view illustrating an external appearance of a refrigerator in accordance with an embodiment of the disclosure and FIG. 2 is a cross-sectional view illustrating the refrigerator in accordance with an embodiment of the disclosure.

As illustrated in FIGS. 1 and 2, a refrigerator 100 may include a main body 110 which forms an external appearance and a storage compartment 120 provided inside the main body 110 with an open front.

The main body 110 may include an inner casing 111 forming the storage compartment 120 and an outer casing 113 forming the external appearance. In addition, the main body 110 may further include a cool air supply device for supplying cool air to the storage compartment 120.

The cool air supply device may include a compressor C, a condenser (not shown), an expansion valve (not shown), an evaporator 126, a blowing fan 127 and, a foaming heat insulating material 115 may be foamed between the inner casing 111 and the outer casing 113 to prevent the cool air from flowing out of the storage compartment 120.

A machine compartment 123 may be provided at the rear lower side of the main body 110 to have the compressor C for compressing a refrigerant and the condenser condensing the compressed refrigerant installed therein.

The storage compartment 120 may be partitioned by a partition 117 into left and right sections, and a refrigerating compartment 121 is provided on the right side of the main body 110 and a freezing compartment 122 is provided on the left side of the main body 110.

The refrigerator 100 may further include a door 130 for opening or closing the storage compartment 120.

The refrigerating compartment 121 and the freezing compartment 122 are opened or closed by a refrigerating compartment door 131 and a freezing compartment door 133, respectively, which are pivotally coupled to the main body 110, and a plurality of door guards 135 may be provided on the rear sides of the refrigerating compartment door 131 and the freezing compartment door 133 to accommodate food and the like.

The storage compartment 120 may be provided with a plurality of shelves 124 to divide the storage compartment 120 into a plurality of storage compartments, and articles such as food and the like may be loaded on the shelves 124.

In addition, the storage compartment 120 may be provided with a plurality of storage boxes 125 to be slidingly drawn in and out.

The refrigerator 100 may further include a hinge module 140 including an upper hinge 141 and a lower hinge 143 for allowing the door 130 to be pivotally coupled to the main body 110.

A foam space S may be provided between the inner casing 111 forming the storage compartment 120 and the outer casing 113 coupled to the outer side of the inner casing 111 to form the external appearance, and the foaming heat insulating material 115 may be filled in the foam space S.

It is possible to fill a vacuum insulation panel 1 together with the foaming heat insulating material 115 in order to supplement a heat insulating property of the foaming heat insulating material 115.

Figure 3:
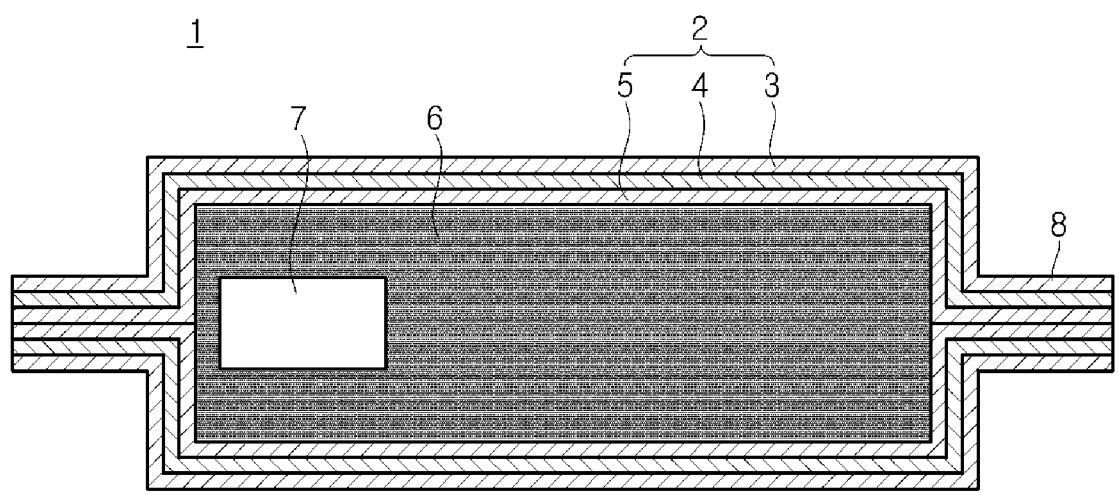
FIG. 3 is a cross-sectional view schematically illustrating a vacuum heat insulating material in accordance with an embodiment of the disclosure.

FIG. 3 is a schematic cross-sectional view showing an example of the vacuum heat insulating material 1. As shown in FIG. 3, the vacuum insulation panel 1 of the disclosure is configured such that a core material 6 and an adsorbent 7 are covered with two envelopes so as to be enclosed and sealed by envelopes.

The two envelopes has a bag-like shape as a whole with an opening end formed around them and three sealed (for example, heat-sealed) directions, which accompanies the core material 6 and the adsorbent 7 and then depressurizes the inside to seal (for example, heat seal) the opening. Reference numeral 8 denotes a coupling portion where the opening is sealed. Hereinafter, each member of the vacuum insulation panel of the disclosure will be described.

The envelope 2 of the disclosure may be embodied in any conventional material that may be a variety of materials and composite materials having a gas barrier property and capable of suppressing gas intrusion. Typically, the envelope is provided with a barrier property by laminating a thermoplastic resin, a metal foil or a plastic film, thereby isolating the core material from air or moisture.

According to a preferred embodiment, as shown in FIG. 3, a laminate film usable as the envelope 2 may have a form that has the innermost layer set up as a heat welding layer (heat welding film) 5 the middle layer set up as a gas barrier layer (gas barrier film), which is a metal foil layer or a metal deposition layer and the outermost layer set up as a surface protective layer (surface protective film) 3.

The heat welding film 5 is dissolved by heat and pressure and solidified, thereby maintaining the envelope 2 in a predetermined shape. In addition, the heat welding film 5 plays a role of preventing gas or water vapor from intruding into the vacuum insulation panel 1 from the end of the envelope 2.

The heat welding film 5 is not particularly limited as long as it can be bonded by a conventional seal method (for example, heat seal). Examples of the material constituting the heat welding film may include polyolefins such as low density polyethylene, linear low density polyethylene, high density polyethylene and polypropylene, ethylene-vinyl acetate copolymer, ethylene-methacrylic acid copolymer, ethylene-acrylic acid ester copolymer, polyacrylonitrile, and other thermoplastic resins. The above materials may be used alone or in combination of two or more. The heat welding film 5 may be a single layer or a laminate of two or more layers. In the latter case, each layer may have the same composition or different composition.

The thickness of the heat welding film 5 may not be particularly limited and may have the same thickness as known to the public. Specifically, the thickness of the heat welding film 5 may be preferably 10 µm to 100 µm. If the thickness of the heat welding film is thinner than 10 µm, sufficient adhesion strength may not be obtained for heat sealing, and if the thickness of the heat welding film is thicker than 100 µm, processability such as flexibility may be deteriorated. However, in the case where the heat welding film has a laminate structure of two or more layers, the thickness of the heat welding film means the combined thickness. In this case, the thicknesses of the respective layers may be the same or different.

The gas barrier film may not be particularly limited, and may be embodied with a metal foil such as an aluminum foil or a copper foil or a film obtained by depositing a metal element such as aluminum or copper or a metal oxide such as alumina or silica on a polyethylene terephthalate film or an ethylene-vinyl alcohol copolymer. The thickness of the gas barrier film may not be particularly limited and may be the same as the known thickness.

There is no particular limitation on the surface protective film 3, and the same materials conventionally used for the surface protective film of the envelope may be used. Examples of the material constituting the surface protective film may include polyamide (nylon) (PA) such as nylon-6 and nylon-66, polyesters such as polyethylene terephthalate (PET), polyethylene naphthalate (PEN) and polybutylene terephthalate (PBT), polyolefins such as polyethylene (PE), polypropylene (PP) and polystyrene (PS), polyimide, polyacrylate, polyvinyl chloride (PVC), polyvinylidene chloride (PVDC), ethylene vinyl alcohol copolymer (EVOH), polyvinyl alcohol resin (PVA), polycarbonate (PC), polyethersulfone (PES), polymethylmethacrylate (PMMA) and polyacrylonitrile resin (PAN), and the like.

The thickness of the surface protective film 3 may not be particularly limited and may have the same thickness as known to the public. Specifically, the thickness of the surface protective film 3 may be preferably 10 µm to 100 µm. If the thickness of the surface protective film 3 is thinner than 10 µm, the barrier layer may not be sufficiently protected. If the thickness of the surface protective film 3 is thicker than 100 µm, the processability such as flexibility may be deteriorated as in the case of the heat welding film. However, when the surface protective film 3 has a laminated structure of two or more layers, the thickness means the combined thickness. In this case, the thickness of each layer may be the same or different.

In addition, various known additives and stabilizers such as an antistatic agent, an ultraviolet ray inhibitor, a plasticizer, a lubricant and the like may be used for these films.

The above materials may be used alone or in a mixture of two or more. The surface protective film may be a single layer or a laminate of two or more layers. In the latter case, each layer may have the same composition or different composition.

There is no particular limitation on the thickness of the envelope 2. Specifically, the thickness of the envelope 2 may be preferably 1 µm to 100 µm.

The thin envelope as described above may more effectively supress/prevent a heat bridge phenomenon to improve the heat insulating performance, and may also have excellent gas barrier property and processability.

According to another preferred embodiment, the envelope 2 made of a gas barrier film may be composed of at least two surfaces: a surface formed of a laminate film laminated with a metal foil and a surface formed of a laminate film that is not laminated with a metal foil, and, the surface formed of the laminate film that is not laminated with the metal foil may have at least one of a film layer made of an ethylene-vinyl alcohol copolymer resin composition in which aluminum is vapor-deposited and a film layer made of a polyethylene terephthalate resin composition in which aluminum is vapor-deposited.

In addition, the envelope 2 according to the disclosure may not be the laminate film as described above, and may be, for example, a metal container, a glass container, or a gas barrier container in which resin and metal are laminated. For the plastic laminate film container, a container in which one or more types of films such as polyvinylidene chloride, polyvinyl alcohol, polyester, polypropylene, polyamide, polyethylene, and metal deposition films are laminated may be used.

As shown in FIG. 3, the core material 6 may be disposed inside the envelope. The core material that may be used in the disclosure may be a skeleton of the vacuum heat insulating material to form a vacuum space. Here, there is no particular limitation on the material of the core material 6, and any known materials may be used. Specifically the material of the core material 6 may include inorganic fibers such as glass wool, rock wool, alumina fibers, metal fibers made of a metal having a low thermal conductivity, and the like; cellulose fibers made of synthetic fibers such as polyester, polyamide, acrylic, polyolefin, aramid, and wood pulp, natural fibers such as cotton, hemp, wool, and silk, regenerated fibers such as rayon, and semi-synthetic fibers such as acetate and the like. The material of the core material may be used alone, or may be a mixture of two or more types. Of these, glass wool is preferred. The core material made of these materials may have a high elasticity of the fibers themselves and low thermal conductivity of the fibers themselves. And the core material made of these materials may be commercially inexpensive.

The adsorbent 7 of FIG. 3 may be stored inside a hard case, which has a gas permeable opening, or gas permeable film in the form of a powdery body or a compression molded body. An example of the gas permeable opening may be a top end opening of the hard case. The compression-molded body may be formed into a mass body in granules or pellets, and a plurality of mass bodies may be dispersed in the core material.

The adsorbent 7 may adsorb a heat transfer medium. The heat transfer medium may be used as a concept covering the target material. For one example, the heat transfer medium may include oxygen, hydrogen, moisture, and the like. However, it is sufficient that the heat transfer medium includes any material that may transfer heat, without being limited to oxygen, hydrogen, moisture, and the like. The following description will focus on a case that oxygen, hydrogen, and moisture are used as the heat transfer medium as well as the target material. Oxygen, hydrogen, and moisture may be in a gas state.

The adsorbent 7 may be accommodated in the inside of the envelope 2 together with the core material 6.

As shown in FIG. 4, the adsorbent 7 may include a first adsorption component. The first adsorption component may mainly adsorb oxygen. In other words, the target material of the first adsorption component may be oxygen.

The first adsorption component may include a transition metal oxide having an oxygen deficiency structure. The transition metal oxide may not be particularly limited as long as it is in the oxygen deficiency structure, but may be preferably at least one of titanium oxide and cerium oxide, for example.

The titanium oxide having the oxygen deficiency structure may be particularly preferred to retain a crystal structure of titanium dioxide and to be $TiO_{2-x}$ (x: 0.1 or more and 0.5 or less) where 0.01% to 50% of oxygen atoms are desorbed from the titanium dioxide. Known titanium oxides may be used (see Japanese Patent Publication No. 2004-137087 and Japanese Patent Publication No. 11-12115).

Instead of or in addition to the titanium oxide, other transition metal oxides having the oxygen deficiency, for example, cerium oxides may also be used as the first adsorption component (deoxygenation component). The cerium oxide having the oxygen deficiency structure may be particularly preferred to retain a crystal structure of cerium dioxide and to be $CeO_{2-x}$ (x: 0.1 or more and 0.7 or less) where 0.01% to 50% of oxygen atoms are desorbed from the cerium dioxide. Known cerium oxides may be used (see WO2008/099935, WO2008/140004, Japanese Patent Publication No. 2008-178859, Japanese Patent Publication No. 2007-222868).

Since the titanium oxide or cerium oxide having the oxygen deficiency has a very high oxygen adsorption rate, if the titanium oxide or cerium oxide is released into the atmosphere in a powdery state, it may be heated by heat of adsorption and may be ignited by reaction with oxygen in the atmosphere. A technique for coping with this through capping by a mixture of resin with a titanium oxide or a cerium oxide and the like or by a carbon dioxide is also known. However, under a reduced pressure, the mixture with resin may generate out gas from the resin, and in the case of capping by carbon dioxide, carbon dioxide may be likely to be out gas.

Therefore, there is a handling problem in the atmosphere before the titanium oxide, cerium oxide, and the like is inserted into the vacuum heat insulating material. Here, it may be possible to rate-control reaction of the titanium oxide, cerium oxide, or the like, which has oxygen deficiency, with oxygen through a method of mixing the titanium oxide or cerium oxide with the second adsorption component, which is provided to adsorb moisture, a method of using a type of a dry coated tablet that encloses a nucleus of as the titanium oxide, cerium oxide or the like with the second adsorption component, and the like.

As shown in FIG. 4, the adsorbent 7 may further include a second adsorption component provided to adsorb moisture. In other words, the second adsorption component may make moisture the main target material.

As the second adsorption component, an alkaline earth metal oxide, which is a chemical second adsorption component, may be preferable, and calcium oxide in particular may be preferable in terms of cost. Zeolite, alumina, silica gel and the like may be used as a second physicochemical adsorption component, but zeolite may be preferable. As an example, the alkaline earth metal oxide may include at least one of magnesium oxide, calcium oxide, strontium oxide and barium oxide. The zeolite may be a hydrophobic zeolite consisting of porous crystalline aluminum silicate, and the silica to alumina ratio (Si/Al) in the zeolite framework may be from 1 to 1500, preferably from 5 to 1000 and more preferably from 5.5 to 500.

The specific surface area of calcium oxide, zeolite or a mixture thereof as an example of the second adsorption component that surrounds titanium oxide or cerium oxide having oxygen deficiency may be preferably 0.1 to 1000 $m^2/g$ when measured by a BET measurement method, more preferably 1 to 500 $m^2/g$, and even more preferably 3 to 300 $m^2/g$.

In the adsorbent 7, the content ratio of the first adsorption component such as titanium oxide or cerium oxide to the second adsorption component may not be particularly limited as long as the desired deoxidizing performance and water adsorption performance can be obtained. In one example, the content ratio of titanium oxide, cerium oxide, etc. to the second adsorption component may be 1:4 to 1:4000. As shown in FIG. 4, the adsorbent 7 may further include a third adsorption component provided to adsorb hydrogen. In other words, the main target material of the third adsorption component may be hydrogen.

As a result of studies by the present inventors, it has been found that when titanium oxide or cerium oxide having oxygen deficiency is produced by hydrogen reduction, hydrogen is released from titanium oxide, cerium oxide, or the like under reduced pressure. This may be because the hydrogen which is trapped in a deficient portion is released from titanium oxide or cerium oxide during the oxygen adsorption process in the reduced pressure state in order to make an oxygen deficiency structure by hydrogen reduction. Therefore, it has been found that when the above-mentioned titanium oxide or cerium oxide is applied to the vacuum heat insulating material, hydrogen is released and the thermal conductivity of the vacuum heat insulating material may be deteriorated. Hydrogen is a gas with a higher thermal conductivity compared with nitrogen, oxygen, and water, and therefore gives a great influence on deterioration of thermal conductivity when present in the vacuum heat insulating material. Therefore, the adsorbent 7 of the disclosure may preferably contain the third adsorption component to adsorb hydrogen. By placing the second adsorption component and the first adsorption component such as titanium oxide or cerium oxide having oxygen deficiency in the same space, hydrogen released in the process of adsorbing oxygen by titanium oxide or cerium oxide is adsorbed by the third adsorption component, the existing small amount of hydrogen is turned into water, and the converted water is adsorbed by the second adsorption component coexisting in the adsorbent 7, thereby preventing deterioration of the thermal conductivity of the reduced-pressure environment.

The third adsorption component may include at least one of palladium oxide, zinc oxide, palladium, titanium, nickel and magnesium.

The content ratio of the first adsorption component in the adsorbent 7, such as titanium oxide or cerium oxide, and the third adsorption component may not be particularly limited as long as the desired deoxidizing performance and dehydrogenation performance can be obtained. For example, a vacuum heat insulating material having a good thermal conductivity may be realized by setting the weight ratio of the third adsorption component to titanium oxide or cerium oxide to 0.01 or more, preferably 0.02 or more, more preferably 0.05 or more, and further preferably 0.1 or more. The weight ratio of the third adsorption component to titanium oxide or cerium oxide may be high, but it may be preferably low in terms of economy. For example, the weight ratio of the third adsorption component to titanium oxide or cerium oxide may be 5 or less, preferably 4.5 or less, more preferably 2 or less, still more preferably 1 or less. In addition, in order to obtain desired deoxidizing performance and dehydrogenation performance, it is preferred that a transition metal oxide such as titanium oxide or cerium oxide having oxygen deficiency structure of 0.01 mg/L or more, preferably 0.1 mg/L or more, more preferably 0.5 mg/L or more, still more preferably 1 mg/L or more, the most preferably 10 mg/L or more with respect to the volume of the pore formed by the core material 6 in the envelope 2, and the third adsorption component having the above mentioned weight ratio are contained.

At least one of the first adsorption component, the second adsorption component and the third adsorption component may adsorb the target material even in the reduced pressure environment. At this time, the main target material of the first adsorption component may be oxygen, the main target material of the second adsorption component may be water, and the main target material of the third adsorption component may be hydrogen.

The adsorbent 7 may have the form of a mixture (composition) containing the first adsorption component and the second adsorption component. Alternatively, the adsorbent 7 may have the form of a mixture (composition) containing the first adsorption component, the second adsorption component and the third adsorption component.

A method of manufacturing the adsorbent 7 will be briefly described below.

Figure 5:
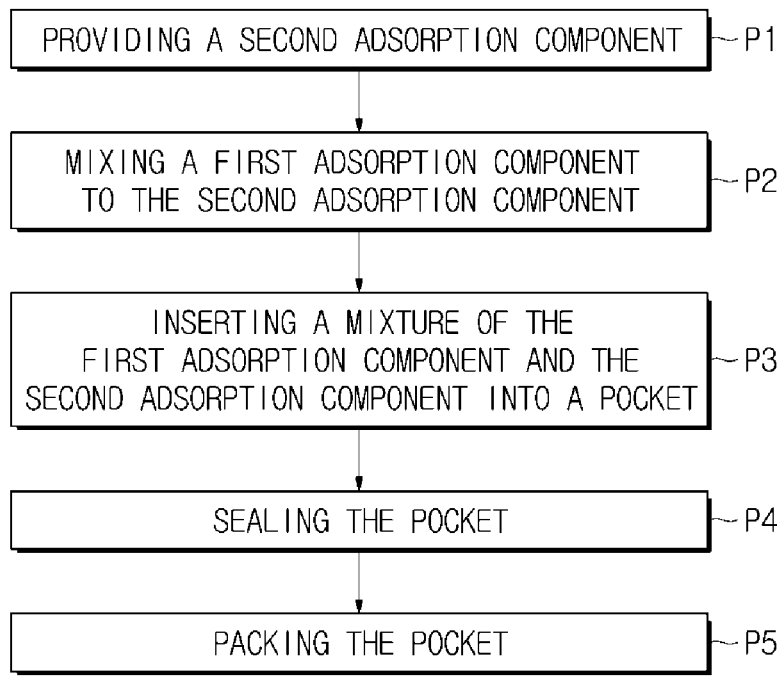
FIG. 5 is a block diagram showing a first method for producing an adsorbent of a vacuum heat insulating material in accordance with an embodiment of the disclosure.

As shown in FIG. 5, a method of manufacturing the adsorbent 7 may include steps of providing the second adsorption component for adsorbing moisture (S1), mixing the first adsorption component for adsorbing oxygen with the second adsorption component (S2), inserting the mixture of the first adsorption component and the second adsorption component into a pocket (S3), and sealing, that is, heat sealing the pocket in which the first adsorption component and the second adsorption component are inserted (S4).

The pocket may have ventilation property.

The pocket may include at least one of a nonwoven fabric and a Tyvek.

Figure 6:
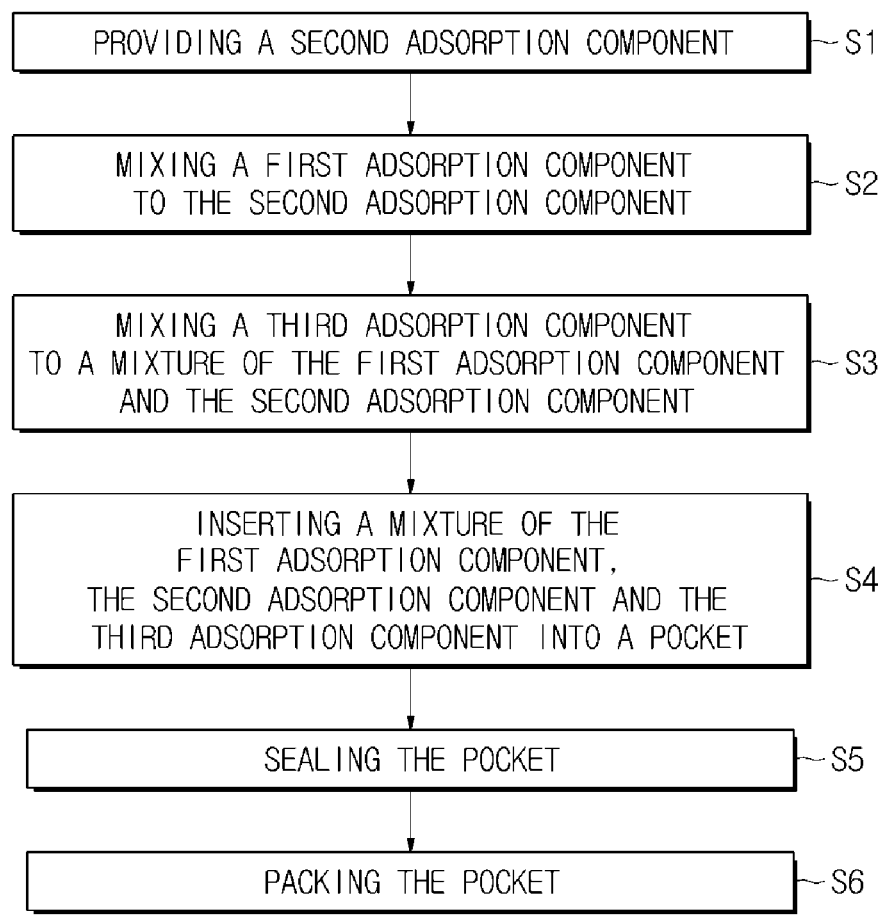
FIG. 6 is a block diagram showing a second method for producing an adsorbent of a vacuum heat insulating material in accordance with an embodiment of the disclosure.

As shown in FIG. 6, the method of manufacturing the adsorbent 7 may further include mixing the third adsorption component for adsorbing hydrogen with the first adsorption component and the second adsorption component. The mixture of the first adsorption component, the second adsorption component and the third adsorption component may be inserted into the pocket. Additionally, the pocket into which the first adsorption component, the second adsorption component and the third adsorption component are inserted may be sealed. Specifically, the method of manufacturing the adsorbent 7 may include providing the second adsorption component for adsorbing moisture (P1), mixing the first adsorption component for adsorbing oxygen with the second adsorption component (P2), mixing the third adsorption component for adsorbing hydrogen with the mixture of the first adsorption component and the second adsorption component (P3), inserting the mixture of the first adsorption component, the second adsorption component and the third adsorption component into the pocket (P4), and sealing, that is heat sealing, the pocket into which the first adsorption component, the second adsorption component and the third adsorption component are inserted (P5).

In addition, the method of manufacturing the adsorbent 7 may further include packing the sealed, that is heat sealed, pocket (S5, P6). The packing may be made with aluminum (Al) material.

[Manufacturing of Vacuum Heat Insulating Material]

A laminate film obtained by dry laminating and connecting stretched nylon (25 μm), polyethylene terephthalate film (12 μm), aluminum foil (7 μm) and high-density polyethylene film (50 μm) was used for the envelope of the vacuum heat insulating material, and a laminate of short fiber glass wool having an average diameter of about 4 μm was used as the core material. The vacuum heat insulating material was prepared by adjusting the adsorbent according to the following examples, adding the adjusted adsorbent in a laminate and using the envelope. The thermal conductivity of the vacuum heat insulating material was evaluated using HFM436 (NETZSCH Japanese device).

EXAMPLE 1

An oxygen-deficient titanium oxide 8.6 mg, a calcium oxide (made by Yoshizawa Lime Co., Ltd.) 4.0 mg and a palladium oxide (PdO: Wako Pure Chemical Industries, Ltd.) 0.1 mg were mixed, and the mixture was put in a porous nonwoven fabric (70 mm×70 mm, Yamanaka Kagaku Co., Ltd.), which was sealed in all directions to obtain the second adsorption component. After the vacuum heat insulating material (290 mm×410 mm×12 mm) is formed as described above, the thermal conductivity after one day at room temperature and the thermal conductivity after 14 days of acceleration test were evaluated. The difference between the thermal conductivity after one day and the thermal conductivity after the acceleration test was 0.27 mW/m·K. The content (mg/L) of the titanium oxide with respect to the volume of the pore space of the vacuum heat insulating material may be 6.70. The weight ratio ($PdO/TiO_{2-x}$) of palladium oxide to oxygen-deficient titanium oxide may be 0.012.

EXAMPLE 2

The procedure of Example 1 was repeated except that oxygen-deficient titanium oxide 8.5 mg and palladium oxide 0.2 mg were used. The difference between the thermal conductivity after one day and the thermal conductivity after the acceleration test was 0.25 mW/m·K. The content (mg/L) of the titanium oxide with respect to the volume of the pore space of the vacuum heat insulating material may be 6.62. $PdO/TiO_{2-x}$ may be 0.024.

EXAMPLE 3

The procedure of Example 1 was repeated except that oxygen-deficient titanium oxide 7.0 mg and palladium oxide 1.7 mg were used. The difference between the thermal conductivity after one day and the thermal conductivity after the acceleration test was 0.24 mW/m·K. The content (mg/L) of the titanium oxide with respect to the volume of the pore space of the vacuum heat insulating material may be 5.45. $PdO/TiO_{2-x}$ may be 0.24.

EXAMPLE 4

The procedure of Example 1 was repeated except that oxygen-deficient titanium oxide 3.0 mg and palladium oxide 5.7 mg were used. The difference between the thermal conductivity after one day and the thermal conductivity after the acceleration test was 0.23 mW/m·K. The content (mg/L) of the titanium oxide with respect to the volume of the pore space of the vacuum heat insulating material may be 2.34. PdO/TiO$_{2-x}$ may be 1.9.

EXAMPLE 5

The procedure of Example 1 was repeated except that oxygen-deficient titanium oxide 1.7 mg and palladium oxide 7.0 mg were used. The difference between the thermal conductivity after one day and the thermal conductivity after the acceleration test was 0.27 mW/m·K. The content (mg/L) of the titanium oxide to the volume of the pore space of the vacuum heat insulating material may be 1.32. PdO/TiO$_{2-x}$ may be 4.1.

EXAMPLE 6

The procedure of Example 1 was repeated except that oxygen-deficient titanium oxide 50 mg and palladium oxide 1.0 mg were used. The difference between the thermal conductivity after one day and the thermal conductivity after the acceleration test was 0.23 mW/m·K. The content (mg/L) of the titanium oxide with respect to the volume of the pore space of the vacuum heat insulating material may be 38.94. PdO/TiO$_{2-x}$ may be 0.020.

COMPARATIVE EXAMPLE 1

The procedure of Example 1 was repeated except that palladium oxide was not added and oxygen-deficient titanium oxide 8.7 mg was used. The difference between the thermal conductivity after one day and the thermal conductivity after the acceleration test was 0.83 mW/m·K. The content (mg/L) of the titanium oxide to the volume of the pore space of the vacuum heat insulating material may be 6.77. PdO/TiO$_{2-x}$ may be zero.

COMPARATIVE EXAMPLE 2

The procedure of Example 1 was repeated except that oxygen-deficient titanium oxide 8.65 mg and palladium oxide 0.05 mg were used. The difference between the thermal conductivity after one day and the thermal conductivity after the acceleration test was 0.51 mW/m·m·K. The content (mg/L) of the titanium oxide with respect to the volume of the pore space of the vacuum heat insulating material may be 6.74. PdO/TiO$_{2-x}$ may be 0.006.

COMPARATIVE EXAMPLE 3

The procedure of Example 1 was repeated except that oxygen-deficient titanium oxide was not added and palladium oxide 8.7 mg was used. The difference between the thermal conductivity after one day and the thermal conductivity after the acceleration test was 0.31 mW/m·K.

Table 1 and Table 2 may collectively show the results of Examples 1 to 6 and the results of Comparative Examples 1 to 3, respectively.

TABLE 1

| | | Example 1 | Example 2 | Example 3 | Example 4 | Example 5 | Example 6 |
|---|---|---|---|---|---|---|---|
| Second adsorption component | CaO(g) | 4 | 4 | 4 | 4 | 4 | 4 |
| | zeolite(g) | — | — | — | — | — | — |
| First adsorption component (TiO$_{2-x}$) | mg | 8.6 | 8.5 | 7 | 3 | 1.7 | 50 |
| | mg/L | 6.70 | 6.62 | 5.45 | 2.34 | 1.32 | 38.94 |
| Third adsorption component (PdO) | mg | 0.1 | 0.2 | 1.7 | 5.7 | 7 | 1 |
| | mg/L | 0.078 | 0.16 | 1.3 | 4.4 | 5.45 | 0.78 |
| PdO/TiO$_{2-x}$ | | 0.012 | 0.024 | 0.24 | 1.9 | 4.1 | 0.020 |
| Change of thermal conductivity (mW/m · K) | | 0.27 | 0.25 | 0.24 | 0.23 | 0.27 | 0.23 |

TABLE 2

| | | Comparative Example 1 | Comparative Example 2 | Comparative Example 3 |
|---|---|---|---|---|
| Second adsorption component | CaO(g) | 4 | 4 | 4 |
| | zeolite(g) | — | — | — |
| First adsorption component (TiO$_{2-x}$) | mg | 8.7 | 8.65 | 0 |
| | mg/L | 6.77 | 6.74 | 0 |
| Third adsorption component (PdO) | mg | 0 | 0.05 | 8.7 |
| | mg/L | 0 | 0.04 | 6.77 |
| PdO/TiO$_{2-x}$ | | 0 | 0.006 | — |
| Change of thermal conductivity (mW/m · K) | | 0.83 | 0.51 | 0.31 |

When the weight ratio of the third adsorption component to the oxygen-deficient transition metal was 0.01 or more, the vacuum heat insulating material having good thermal conductivity was obtained.

REFERENTIAL EXAMPLE 1

An oxide of titanium having oxygen deficiency (titanium oxide, T rack NUT a coating property) 100 mg, ZSM-5 type zeolite (Toro) 0.5 g and calcium oxide (manufactured by Yoshizawa Lime Co., Ltd.) 4.0 g were mixed, and the mixture was inserted in the porous nonwoven fabric (70 mm×70 mm, Yamanaka Kagaku Co., Ltd.), which was sealed in all directions to obtain the adsorbent. As described above, the vacuum heat insulating material (290 mm×410 mm×12 mm) was manufactured, and the thermal conductivity of the vacuum heat insulating material after three days at room temperature was 2.11 mW/m·K. Further, when an acceleration test was performed by periodically changing the environmental temperature and humidity, the thermal conductivity of the vacuum heat insulating material after 7 days was 2.75 mW/m·K. The difference in thermal conductivity (change of thermal conductivity) between the early stage (after 3 days) and after 7 days may be 0.64. The content (mg/L) of the titanium oxide with respect to the volume of the pore space of the vacuum heat insulating material may be 77.87. Further, the volume of the pore space may be defined as multiplication of the volume of the vacuum heat insulating material and the porosity of the core material.

REFERENTIAL EXAMPLE 2

Oxygen-deficient titanium oxide 100 mg and calcium oxide (manufactured by Yoshizawa Lime Co., Ltd.) 4.0 g were mixed, and the mixture was inserted in the porous nonwoven fabric (70 mm×70 mm, Yamanaka Kogyo Co., Ltd.), which was sealed in all directions to obtain the second adsorption component. As described above, the vacuum heat insulating material was manufactured, and the thermal conductivity of the vacuum heat insulating material after three days at room temperature was 2.10 mW/m·K. Further, when the acceleration test was carried out, the thermal conductivity after 7 days was 2.58 mW/m·K. The change of the thermal conductivity may be 0.48. The content (mg/L) of the titanium oxide with respect to the volume of the pore space of the vacuum heat insulating material may be 77.87.

REFERENTIAL EXAMPLE 3

Oxygen-deficient titanium oxide 15 mg and calcium oxide (manufactured by Yoshizawa Lime Co., Ltd.) 4.0 g were mixed, and the mixture was inserted in the porous nonwoven fabric (70 mm×70 mm, Yamanaka Kogyo Co., Ltd.), which was sealed in all directions to obtain the second adsorption component. As described above, the vacuum heat insulating material was manufactured, and the thermal conductivity after three days at room temperature was 2.08 mW/m·K. Further, when the acceleration test was carried out, the thermal conductivity after 7 days was 2.60 mW/m·K. The change of the thermal conductivity may be 0.52. The content (mg/L) of the titanium oxide with respect to the volume of the pore space of the vacuum heat insulating material may be 11.68.

REFERENTIAL EXAMPLE 4

Oxygen-deficient titanium oxide 50 mg and calcium oxide (made by Yoshizawa Lime Co., Ltd.) 4.0 g were mixed and the mixture was inserted in the porous nonwoven fabric (70 mm×70 mm, Yamanaka Kogyo Co., Ltd.), which was sealed in all directions to obtain the second adsorption component. As described above, the vacuum heat insulating material was manufactured, and the thermal conductivity after three days at room temperature was 1.99 mW/m·K. Further, when the acceleration test was carried out, the thermal conductivity after 7 days was 2.61 mW/m·K. The change of the thermal conductivity may be 0.62. The content (mg/L) of the titanium oxide with respect to the volume of the pore space of the vacuum heat insulating material may be 38.94.

REFERENTIAL EXAMPLE 5

Oxygen-deficient titanium oxide 500 mg and calcium oxide (made by Yoshizawa Lime Co., Ltd.) 4.0 g were mixed and the mixture was inserted in the porous nonwoven fabric (70 mm×70 mm, Yamanaka Kogyo Co., Ltd.), which was sealed in all directions to obtain the second adsorption component. As described above, the vacuum heat insulating material was manufactured, and the thermal conductivity after three days at room temperature was 2.08 mW/m·K. Further, when the acceleration test was carried out, the thermal conductivity after 7 days was 2.67 mW/m·K. The change of the thermal conductivity may be 0.59. The content (mg/L) of the titanium oxide with respect to the volume of the pore space of the vacuum heat insulating material may be 389.4.

REFERENTIAL EXAMPLE 6

Oxygen-deficient titanium oxide 5 mg and calcium oxide (made by Yoshizawa Lime Co., Ltd.) 4.0 g were mixed and the mixture was inserted in the porous nonwoven fabric (70 mm×70 mm, Yamanaka Kogyo Co., Ltd.), which was sealed in all directions to obtain the second adsorption component. As described above, the vacuum heat insulating material was manufactured, and the thermal conductivity after three days at room temperature was 2.09 mW/m·K. Further, when the acceleration test was carried out, the thermal conductivity after 7 days was 2.72 mW/m·K. The change of the thermal conductivity may be 0.63. The content (mg/L) of the titanium oxide with respect to the volume of the pore space of the vacuum heat insulating material may be 3.89.

If titanium oxide having the oxygen deficiency is even slightly contained in the volume of the pore of the vacuum heat insulating material (the content (mg/L) of the titanium oxide is 0.1 mg and more), the change of the thermal conductivity is small, from which it is understood that the gas absorption in the vacuum heat insulating material is effectively performed.

COMPARATIVE EXAMPLE 4

The vacuum heat insulating material was manufactured using only calcium oxide 4.0 g (manufactured by Yoshizawa Lime Co., Ltd.) without using titanium oxide having the oxygen deficiency in the adsorbent. The thermal conductivity after 3 days at room temperature was 2.09 mW/m·K. Further, when the acceleration test was carried out, the thermal conductivity after 7 days was 2.78 mW/m·K. The change of the thermal conductivity may be 0.69.

Table 3 collectively shows the results of Referential Examples 1 to 6 and Comparative Example 4.

TABLE 3

| | | Referential Example 1 | Referential Example 2 | Referential Example 3 | Referential Example 4 | Referential Example 5 | Referential Example 6 | Comparative Example 4 |
|---|---|---|---|---|---|---|---|---|
| Second adsorption component | CaO(g) | 4 | 4 | 4 | 4 | 4 | 4 | 4 |
| | zeolite(g) | 0.5 | — | — | — | — | — | — |
| First adsorption component ($TiO_{2-x}$) | mg | 100 | 100 | 15 | 50 | 500 | 5 | 0 |
| | mg/L | 77.87 | 77.87 | 11.68 | 38.94 | 389.4 | 3.89 | 0 |

TABLE 3-continued

|  |  | Referential Example 1 | Referential Example 2 | Referential Example 3 | Referential Example 4 | Referential Example 5 | Referential Example 6 | Comparative Example 4 |
|---|---|---|---|---|---|---|---|---|
| Third adsorption component (PdO) | mg | 0 | 0 | 0 | 0 | 0 | 0 | 0 |
|  | mg/L | 0 | 0 | 0 | 0 | 0 | 0 | 0 |
| Thermal conductivity (mW/m·K) | 3 days | 2.11 | 2.10 | 2.08 | 1.99 | 2.08 | 2.09 | 2.09 |
|  | 7 days | 2.75 | 2.58 | 2.60 | 2.61 | 2.67 | 2.72 | 2.78 |
| Change of thermal conductivity (mW/m·K) |  | 0.64 | 0.48 | 0.52 | 0.62 | 0.59 | 0.63 | 0.69 |

EXAMPLE 7

Oxygen-deficient cerium oxide (cerium oxide, Mitsui Metal Mining Co.) 15 mg, calcium oxide (made by Yoshizawa Lime Co., Ltd.) 4.0 g and palladium oxide (Wako Pure Chemical Industries, Ltd.) 1 mg were mixed, and the mixture was inserted in the porous nonwoven fabric (70 mm×70 mm, Yamanaka Kogyo Co., Ltd.), which was sealed in all directions to obtain the adsorbent. As described above, the vacuum heat insulating material (290 mm×410 mm×12 mm) was manufactured, and the thermal conductivity of the vacuum heat insulating material after three days at room temperature was measured to be 2.08 mW/m·K. Further, when the acceleration test was carried out by periodically changing environmental temperature and humidity, the thermal conductivity after one month was 3.13 mW/m·K. The content (mg/L) of the cerium oxide with respect to the volume of the pore space of the vacuum heat insulating material may be 11.68. The difference between the thermal conductivity after 3 days and the thermal conductivity after the acceleration test was 1.05 mW/m·K. The weight ratio (PdO/CeO$_{2-x}$) of palladium oxide to oxygen-deficient cerium oxide may be 0.067.

EXAMPLE 8

Oxygen-deficient cerium oxide (Mitsui Metal Mining Co.) 15 mg, calcium oxide (made by Yoshizawa Lime Co., Ltd.) 4.0 g and palladium oxide (Wako Pure Chemical Industries, Ltd.) 3 mg were mixed, and the mixture was inserted in the porous nonwoven fabric (70 mm×70 mm, Yamanaka Kogyo Co., Ltd.), which was sealed in all directions to obtain the adsorbent. As described above, the vacuum heat insulating material (290 mm×410 mm×12 mm) was manufactured, and the thermal conductivity of the vacuum heat insulating material after three days at room temperature was measured to be 2.08 mW/m·K. Further, when the acceleration test was carried out, the thermal conductivity after one month was 3.37 mW/m·K. The content (mg/L) of the cerium oxide with respect to the volume of the pore space of the vacuum heat insulating material may be 11.68. The difference between the thermal conductivity after 3 days and the thermal conductivity after the acceleration test was 1.29 mW/m·K. The weight ratio (PdO/CeO$_{2-x}$) of palladium oxide to oxygen-deficient cerium oxide may be 0.20.

EXAMPLE 9

Oxygen-deficient cerium oxide (Mitsui Metal Mining Co.) 15 mg, calcium oxide (made by Yoshizawa Lime Co., Ltd.) 4.0 g and palladium oxide (Wako Pure Chemical Industries, Ltd.) 5 mg were mixed, and the mixture was inserted in the porous nonwoven fabric (70 mm×70 mm, Yamanaka Kogyo Co., Ltd.), which was sealed in all directions to obtain the adsorbent. As described above, the vacuum heat insulating material (290 mm×410 mm×12 mm) was manufactured, and the thermal conductivity after three days at room temperature was measured to be 2.15 mW/m·K. Further, when the acceleration test was carried out, the thermal conductivity after one month was 3.38 mW/m·K. The content (mg/L) of the cerium oxide with respect to the volume of the pore space of the vacuum heat insulating material may be 11.68. The difference between the thermal conductivity after 3 days and the thermal conductivity after the acceleration test was 1.23 mW/m·K. The weight ratio (PdO/CeO$_{2-x}$) of palladium oxide to oxygen-deficient cerium oxide may be 0.33.

EXAMPLE 10

Oxygen-deficient cerium oxide (Mitsui Metal Mining Co.) 15 mg, calcium oxide (made by Yoshizawa Lime Co., Ltd.) 4.0 g and palladium oxide (Wako Pure Chemical Industries, Ltd.) 10 mg were mixed, and the mixture was inserted in the porous nonwoven fabric (70 mm×70 mm, Yamanaka Kogyo Co., Ltd.), which was sealed in all directions to obtain the adsorbent. As described above, the vacuum heat insulating material (290 mm×410 mm×12 mm) was manufactured, and the thermal conductivity after three days at room temperature was measured to be 2.13 mW/m·K. Further, when the acceleration test was carried out, the thermal conductivity after one month was 3.42 mW/m·K. The content (mg/L) of the cerium oxide with respect to the volume of the pore space of the vacuum heat insulating material may be 11.68. The difference between the thermal conductivity after 3 days and the thermal conductivity after the acceleration test was 1.29 mW/m·K. The weight ratio (PdO/CeO$_{2-x}$) of palladium oxide to oxygen-deficient cerium oxide may be 0.67.

EXAMPLE 11

Oxygen-deficient cerium oxide (Mitsui Metal Mining Co.) 15 mg, calcium oxide (made by Yoshizawa Lime Co., Ltd.) 4.0 g, ZSM-5 type zeolite (Toso) 0.5 g and palladium oxide (Wako Pure Chemical Industries, Ltd.) 1 mg were mixed, and the mixture was inserted in the porous nonwoven fabric (70 mm×70 mm, Yamanaka Kogyo Co., Ltd.), which was sealed in all directions to obtain the adsorbent. As described above, the vacuum heat insulating material (290 mm×410 mm×12 mm) was manufactured, and the thermal conductivity after three days at room temperature was measured to be 2.16 mW/m·K. Further, when the acceleration test was carried out, the thermal conductivity after one month was 3.36 mW/m·K. The content (mg/L) of the cerium oxide with respect to the volume of the pore space of the vacuum heat insulating material may be 11.68. The difference between the thermal conductivity after 3 days and the thermal conductivity after the acceleration test was 1.20 mW/m·K. The weight ratio (PdO/CeO$_{2-x}$) of palladium oxide to oxygen-deficient cerium oxide may be 0.067.

REFERENTIAL EXAMPLE 7

Oxygen-deficient cerium oxide (Mitsui Metal Mining Co.) 1 mg and calcium oxide (made by Yoshizawa Lime Co., Ltd.) 4.0 g were mixed, and the mixture was inserted in the porous nonwoven fabric (70 mm×70 mm, Yamanaka Kogyo Co., Ltd.), which was sealed in all directions to obtain the adsorbent. As described above, the vacuum heat insulating material (290 mm×410 mm×12 mm) was manufactured, and the thermal conductivity was measured to be 2.04 mW/m·K. Further, when the acceleration test was carried out, the thermal conductivity after one month was 3.78 mW/m·K. The content (mg/L) of the cerium oxide with respect to the volume of the pore space of the vacuum heat insulating material may be 0.78. The difference between the thermal conductivity after 3 days and the thermal conductivity after the acceleration test was 1.74 mW/m·K. The weight ratio (PdO/CeO$_{2-x}$) of palladium oxide to oxygen-deficient cerium oxide may be zero.

COMPARATIVE EXAMPLE 5

The vacuum heat insulating material was manufactured using only calcium oxide (manufactured by Yoshizawa Lime Co., Ltd.) 4.0 g without using cerium oxide having the oxygen deficiency and palladium oxide in the adsorbent. The thermal conductivity after 3 days at room temperature was 2.11 mW/m·K. Further, when the acceleration test was carried out, the thermal conductivity after one month was 3.94 mW/m·K. The difference between the thermal conductivity after 3 days and the thermal conductivity after the acceleration test was as high as 1.83 mW/m·K.

Table 4 collectively shows the results of Examples 7 to 11, Referential Example 7, and Comparative Example 5.

EXAMPLE 12

Oxygen-deficient titanium oxide 15 mg, calcium oxide (made by Yoshizawa Lime Co., Ltd.) 7.0 g and palladium oxide (Wako Pure Chemical Industries, Ltd.) 1.0 mg were mixed, and the mixture was inserted in the porous nonwoven fabric (70 mm×70 mm, Yamanaka Kogyo Co., Ltd.), which was sealed in all directions to obtain the second adsorption component. The weight ratio of the third adsorption component to the oxygen-deficient titanium oxide may be 0.067. As described above, the vacuum heat insulating material (290 mm×410 mm×12 mm) was manufactured, and the thermal conductivity after three days was measured to be 1.95 mW/m·K.

EXAMPLE 13

Oxygen-deficient titanium oxide 15 mg, calcium oxide (made by Yoshizawa Lime Co., Ltd.) 7.0 g and palladium oxide (Wako Pure Chemical Industries, Ltd.) 0.5 mg were mixed and the mixture was inserted in the porous nonwoven fabric (70 mm×70 mm, Yamanaka Kogyo Co., Ltd.), which was sealed in all directions to obtain the second adsorption component. The weight ratio of the third adsorption component to the oxygen-deficient titanium oxide may be 0.033. As described above, the vacuum heat insulating material (290 mm×410 mm×12 mm) was manufactured, and the thermal conductivity after three days was measured to be 1.98 mW/m·K.

Table 5 collectively shows the results of Examples 12 and 13.

TABLE 5

|  |  | Example 12 | Example 13 |
|---|---|---|---|
| Second adsorption component | CaO(g) | 7 | 7 |
|  | zeolite(g) | — | — |
| First adsorption component (TiO$_{2-x}$) | mg | 15 | 15 |
|  | mg/L | 11.38 | 11.68 |
| Third adsorption component (PdO) | mg | 1 | 0.5 |
|  | mg/L | 0.78 | 0.39 |

TABLE 4

|  |  | Example 7 | Example 8 | Example 9 | Example 10 | Example 11 | Referential Example 7 | Comparative Example 5 |
|---|---|---|---|---|---|---|---|---|
| Second adsorption component | CaO(g) | 4 | 4 | 4 | 4 | 4 | 4 | 4 |
|  | zeolite(g) | — | — | — | — | 0.5 | — | — |
| First adsorption component (CeO$_{2-x}$) | mg | 15 | 15 | 15 | 15 | 15 | 1 | 0 |
|  | mg/L | 11.68 | 11.68 | 11.68 | 11.68 | 11.68 | 0.78 | 0 |
| Third adsorption component (PdO) | mg | 1 | 3 | 5 | 10 | 1 | 0 | 0 |
|  | mg/L | 0.78 | 2.34 | 3.89 | 7.79 | 0.78 | 0 | 0 |
| PdO/CeO$_{2-x}$ |  | 0.067 | 0.20 | 0.33 | 0.67 | 0.067 | 0 | — |
| Thermal conductivity (mW/m · K) | 3 days | 2.08 | 2.08 | 2.15 | 2.13 | 2.16 | 2.04 | 2.11 |
|  | 1 month | 3.13 | 3.37 | 3.38 | 3.42 | 3.36 | 3.78 | 3.94 |

TABLE 5-continued

|  |  | Example 12 | Example 13 |
|---|---|---|---|
| PdO/TiO$_{2-x}$ |  | 0.067 | 0.033 |
| Thermal conductivity (mW/m · K) | 3 days | 1.95 | 1.98 |

According to the examples described above, the target gas in the vacuum heat insulating material may be surely removed by applying the adsorbent including the second adsorption component, the oxygen-deficient titanium oxide or the oxygen-deficient cerium oxide, and the third adsorption component to the vacuum heat insulating material.

Although a few embodiments of the present disclosure have been shown and described, it would be appreciated by those skilled in the art that changes may be made to the embodiments without departing from the principles and spirit of the invention, the scope of which is defined in the claims and their equivalents.

The invention claimed is:

1. A refrigerator, comprising:
an outer casing forming an exterior;
an inner casing provided inside the outer casing and forming a storage chamber; and
a vacuum heat insulating material positioned between the outer casing and the inner casing, and including an adsorbent adsorbing a heat transfer medium such that no activation treatment of the adsorbent is required and adsorption performance of the adsorbent in a vacuum state is maintained relative to adsorption performance of the adsorbent at atmospheric pressure,
wherein the adsorbent comprises:
 a first adsorption component provided to adsorb oxygen, and including a transition metal oxide having an oxygen deficiency structure, wherein the transition metal oxide includes at least one of titanium oxide (TiO$_{2-x}$), where x is 0.1 or more and 0.5 or less, or cerium oxide (CeO$_{2-x}$), where x is 0.1 or more and 0.7 or less;
 a second adsorption component provided to adsorb moisture, and including at least one of an alkaline earth metal oxide or a zeolite; and
 a third adsorption component provided with palladium oxide to adsorb hydrogen,
 wherein a weight ratio of the third adsorption component with respect to the first adsorption component is 0.01 or more and 5 or less, and
 wherein the first adsorption component is provided at 0.5 mg/L to 390 mg/L with respect to a volume of a pore formed by a core material in an envelope of the vacuum heat insulating material.

2. The refrigerator according to claim 1, wherein at least one of the first adsorption component and the second adsorption component adsorbs a target material in a reduced pressure environment.

3. The refrigerator according to claim 1, wherein the alkaline earth metal oxide comprises at least one of calcium oxide, magnesium oxide, strontium oxide and barium oxide.

4. The refrigerator according to claim 1, wherein the third adsorption component adsorbs a target material in a reduced pressure environment.

5. The refrigerator according to claim 1, wherein the third adsorption component further comprises at least one of zinc oxide, palladium, titanium, nickel and magnesium.

6. A vacuum heat insulating material comprising:
a core material;
an adsorbent provided to adsorb a heat transfer medium such that no activation treatment of the adsorbent is required and adsorption performance of the adsorbent in a vacuum state is maintained relative to adsorption performance of the adsorbent at atmospheric pressure; and
an envelope provided to accommodate the core material and the adsorbent,
wherein the adsorbent comprises:
 a first adsorption component provided to adsorb oxygen and including a transition metal oxide having an oxygen deficiency structure, wherein the transition metal oxide includes at least one of titanium oxide (TiO$_{2-x}$), where x is 0.1 or more and 0.5 or less, or cerium oxide (CeO$_{2-x}$), where x is 0.1 or more and 0.7 or less;
 a second adsorption component provided to adsorb moisture, and including at least one of an alkaline earth metal oxide or a zeolite; and
 a third adsorption component provided with palladium oxide to adsorb hydrogen,
 wherein a weight ratio of the third adsorption component with respect to the first adsorption component is 0.01 or more and 5 or less, and
 wherein the first adsorption component is provided at 0.5 mg/L to 390 mg/L with respect to a volume of a pore formed by the core material in the envelope.

7. The vacuum heat insulating material according to claim 6, wherein the alkaline earth metal oxide comprises at least one of calcium oxide, magnesium oxide, strontium oxide and barium oxide.

8. The vacuum heat insulating material according to claim 6, wherein the third adsorption component further comprises at least one of zinc oxide, palladium, titanium, nickel and magnesium.

9. The vacuum heat insulating material according to claim 6, wherein at least one of the first adsorption component and the second adsorption component adsorbs a target material in a reduced pressure environment, and
the third adsorption component adsorbs a target material in a reduced pressure environment.

10. An adsorbent comprising:
a first adsorption component provided to adsorb oxygen and including a transition metal oxide having an oxygen deficiency structure, wherein the transition metal oxide includes at least one of titanium oxide (TiO$_{2-x}$), where x is 0.1 or more and 0.5 or less, or cerium oxide (CeO$_{2-x}$), where x is 0.1 or more and 0.7 or less;
a second adsorption component provided to adsorb moisture, and including at least one of an alkaline earth metal oxide or a zeolite; and
a third adsorption component provided with palladium oxide to adsorb hydrogen,
wherein a weight ratio of the third adsorption component with respect to the first adsorption component is 0.01 or more and 5 or less, and
wherein no activation treatment of the adsorbent is required and adsorption performance of the adsorbent in a vacuum state is maintained relative to adsorption performance of the adsorbent at atmospheric pressure, and
wherein the first adsorption component is provided at 0.5 mg/L to 390 mg/L with respect to a volume of a pore formed by a core material in an envelope of a vacuum heat insulating material.

11. The adsorbent according to claim 10, wherein the alkaline earth metal oxide comprises at least one of calcium oxide, magnesium oxide, strontium oxide, and barium oxide.

12. The adsorbent according to claim 10, wherein the third adsorption component further comprises at least one of zinc oxide, palladium, titanium, nickel, and magnesium.

13. The adsorbent according to claim 10, wherein at least one of the first adsorption component and the second adsorption component adsorbs a target material in a reduced pressure environment, and
the third adsorption component adsorbs a target material in a reduced pressure environment.

* * * * *